US010872525B2

(12) United States Patent
Xu et al.

(10) Patent No.: US 10,872,525 B2
(45) Date of Patent: Dec. 22, 2020

(54) SPEED PREDICTION METHOD AND APPARATUS

(71) Applicant: Hangzhou Hikvision Digital Technology Co., Ltd., Hangzhou (CN)

(72) Inventors: Yuyao Xu, Hangzhou (CN); Shifan Zhao, Hangzhou (CN); Long Wang, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 190 days.

(21) Appl. No.: 16/099,785

(22) PCT Filed: Nov. 4, 2016

(86) PCT No.: PCT/CN2016/104495
§ 371 (c)(1),
(2) Date: Nov. 8, 2018

(87) PCT Pub. No.: WO2017/193556
PCT Pub. Date: Nov. 16, 2017

(65) Prior Publication Data
US 2019/0139402 A1 May 9, 2019

(30) Foreign Application Priority Data
May 11, 2016 (CN) .......................... 2016 1 0309481

(51) Int. Cl.
*G08G 1/01* (2006.01)
*G08G 1/052* (2006.01)
*G06Q 10/04* (2012.01)
(52) U.S. Cl.
CPC .......... *G08G 1/0129* (2013.01); *G06Q 10/04* (2013.01); *G08G 1/01* (2013.01); *G08G 1/052* (2013.01)

(58) Field of Classification Search
CPC ........ G08G 1/052; G08G 1/0129; G08G 1/01; G01C 21/3691
See application file for complete search history.

(56) References Cited

U.S. PATENT DOCUMENTS 6,317,686 B1 * 11/2001 Ran .................... G01C 21/3691
701/117
8,781,716 B1 * 7/2014 Wenneman .......... G08G 1/0129
701/118
(Continued)

FOREIGN PATENT DOCUMENTS

CN          1434946 A      8/2003
CN      101086804 A     12/2007
(Continued)

OTHER PUBLICATIONS

Research on the Methods for Forecasting Short-term Traffic Flow—Abstract.
(Continued)

*Primary Examiner* — Mussa A Shaawat
(74) *Attorney, Agent, or Firm* — Clements Bernard Walker; Lawrence A. Baratta, Jr.; Christopher L. Bernard

(57) ABSTRACT

A speed prediction method and apparatus are disclosed. The method includes: obtaining traffic-effecting parameter information of a first road segment in a current time period (S101), wherein the traffic-effecting parameter information comprises at least one of a parameter of the effect of the current weather on the traffic, a parameter of the effect of an attribute of the current date on the traffic and a parameter of the effect of a special event on the traffic; determining a similarity between the traffic-effecting parameter information and historical traffic-effecting parameter information of the first road segment stored in a historical traffic database (S102), and determining target historical traffic-effecting parameter information according to the determined similar-
(Continued)

ity (S103); and predicting a first speed of a vehicle on the first road segment in the next time period, according to a speed of a vehicle in a next time period of a time period corresponding to the target historical traffic-effecting parameter information, stored in the historical traffic database (S104).

18 Claims, 5 Drawing Sheets

(56) References Cited

U.S. PATENT DOCUMENTS

| | | | |
|---|---|---|---|
| 9,224,293 B2* | 12/2015 | Taylor | G08G 1/0116 |
| 10,393,534 B2* | 8/2019 | Giurgiu | G08G 1/096827 |
| 2006/0064234 A1 | 3/2006 | Masatoshi et al. | |
| 2009/0043486 A1* | 2/2009 | Yang | G01C 21/3492 |
| | | | 701/117 |
| 2010/0070128 A1* | 3/2010 | Johnson | G08G 1/096783 |
| | | | 701/31.4 |
| 2012/0290204 A1 | 11/2012 | Gueziec | |
| 2014/0114556 A1 | 4/2014 | Pan et al. | |
| 2015/0141036 A1 | 5/2015 | Fix et al. | |
| 2015/0228188 A1 | 8/2015 | Macfarlane et al. | |
| 2015/0253144 A1* | 9/2015 | Rau | G01C 21/3484 |
| | | | 705/348 |
| 2016/0275786 A1* | 9/2016 | Fowe | G08G 1/0141 |

FOREIGN PATENT DOCUMENTS

| | | |
|---|---|---|
| CN | 101436347 A | 5/2009 |
| CN | 101510357 A | 8/2009 |
| CN | 102819550 A | 12/2012 |
| CN | 103065469 A | 4/2013 |
| CN | 104346952 A | 2/2015 |
| CN | 105511869 A | 4/2016 |

OTHER PUBLICATIONS

International Search Report for International Application No. PCT/CN2016/104495 dated Feb. 15, 2017.

* cited by examiner

SPEED PREDICTION METHOD AND APPARATUS

The present application claims priority to the Chinese patent application No. 201610309481.3 filed with the China National Intellectual Property Administration on May 11, 2016 and entitled "Speed Prediction Method and Apparatus", which is incorporated herein by reference in its entirety.

TECHNICAL FIELD

The present application relates to the technical field of data processing, and particularly to a speed prediction method and apparatus.

BACKGROUND

As economy develops continuously, traffic congestion has become a big social issue. At present, real-time broadcast of road conditions have been achieved, and users travelling by vehicles can try to change to less congested routes according to the real-time broadcast of road conditions.

However, solution to traffic congestion should first focus on prevention. In the prior art, it is impossible to predict road conditions in a next time period. The real-time broadcast of road conditions alone cannot accurately guide users traveling by vehicles to change their routes. For example, vehicles on a road segment travel smoothly in the current time period, but they may be confronted with very serious congestion in the next time period. Hence, it becomes very necessary to predict vehicles' speeds on a road segment.

SUMMARY

Embodiments of the present application provide a speed prediction method and apparatus, which achieves prediction of speeds of vehicles on a road segment.

To achieve the above object, embodiments of the present application discloses a speed prediction method. The method includes:

obtaining traffic-effecting parameter information of a first road segment in a current time period, wherein the traffic-effecting parameter information includes at least one of a parameter of the effect of the current weather on the traffic, a parameter of the effect of an attribute of the current date on the traffic and a parameter of the effect of a special event on the traffic;

determining a similarity between the traffic-effecting parameter information and historical traffic-effecting parameter information of the first road segment stored in a historical traffic database, and determining target historical traffic-effecting parameter information according to the determined similarity; and predicting a first speed of a vehicle on the first road segment in a next time period, according to a speed of a vehicle in a next time period of a time period corresponding to the target historical traffic-effecting parameter information stored in the historical traffic database.

Optionally, the method may further include:
identifying at least one second road segment with a distance to the first road segment less than a second preset threshold, and obtaining a second speed of a vehicle on each second road segment in the current time period; and predicting a third speed of the vehicle on the first road segment in the next time period according to the first speed and the second speed.

Optionally, the method may further include:
predicting a congestion level for the vehicle on the first road segment in the next time period, according to the predicted speed of the vehicle on the first road segment in the next time period, and a preset correspondence between each speed and a congestion level.

Optionally, obtaining a second speed of a vehicle on each second road segment in the current time period may include:

obtaining a distance between a first base station and a second base station located in the second road segment, a first instant that a mobile device on a vehicle passes by the first base station in the current time period and a second instant that the mobile device on the vehicle passes by the second base station;

calculating a speed of the mobile device on the vehicle between the first base station and the second base station according to the distance, first instant and second instant; and determining an average value of speeds of mobile devices on a plurality of vehicles between the first base station and the second base station as the second speed of the vehicle on the second road segment in the current time period.

Optionally, determining a similarity between the traffic-effecting parameter information and historical traffic-effecting parameter information of the first road segment stored in a historical traffic database may include:

determining a target time period corresponding to the current time period in the historical traffic database; and
determining a similarity between the traffic-effecting parameter information and historical traffic-effecting parameter information of the first road segment in the target time period stored in the historical traffic database.

Optionally, in the case that the traffic-effecting parameter information includes the parameter of the effect of the current weather on the traffic, the parameter of the effect of an attribute of a current date on the traffic and the parameter of the effect of a special event on the traffic, determining a similarity between the traffic-effecting parameter information and historical traffic-effecting parameter information of the first road segment stored in a historical traffic database may include:

obtaining the similarity between the traffic-effecting parameter information and the historical traffic-effecting parameter information of the first road segment stored in the historical traffic database according to the following formula:

$$sim(Q, Q_h) = \frac{WW_h + HH_h + EE_h}{\sqrt{W^2 + H^2 + E^2} * \sqrt{W_h^2 + H_h^2 + E_h^2}}$$

where W, H and E respectively represent the parameter of the effect of the current weather on the traffic, the parameter of the effect of an attribute of the current date on the traffic and the parameter of the effect of a special event on the traffic included in the traffic-effecting parameter information, and $W_h$, $H_h$ and $E_h$ respectively represent a parameter of the effect of a historical weather on the traffic, a parameter of the effect of an attribute of a historical date on the traffic and a parameter of the effect of a special event on the traffic included in the historical traffic-effecting parameter information.

Optionally, determining target historical traffic-effecting parameter information according to the determined similarity may include:

determining historical traffic-effecting parameter information most similar to the traffic-effecting parameter information as the target historical traffic-effecting parameter information.

Optionally, determining target historical traffic-effecting parameter information according to the determined similarity may include:

determining at least two items of historical traffic-effecting parameter information, having a similarity to the traffic-effecting parameter information greater than a first preset threshold, as the target historical traffic-effecting parameter information.

Optionally, predicting a first speed of a vehicle on the first road segment in a next time period, according to a speed of a vehicle in a next time period of a time period corresponding to the target historical traffic-effecting parameter information, stored in the historical traffic database may include:

determining a weight for each item of target historical traffic-effecting parameter information, according to a distance between the traffic-effecting parameter information and the target historical traffic-effecting parameter information;

predicting the first speed of the vehicle on the first road segment in the next time period, according to the weight for each item of target historical traffic-effecting parameter information and the speed of the vehicle in the next time period of a time period corresponding to each item of target historical traffic-effecting parameter information, stored in the historical traffic database.

Optionally, determining a weight for each item of target historical traffic-effecting parameter information, according to a distance between the traffic-effecting parameter information and the target historical traffic-effecting parameter information may include:

determining the weight for each item of target historical traffic-effecting parameter information through the following formula:

$$\beta_i = \frac{d_i^{-1}}{\sum_{i=1}^{K} d_i^{-1}}, (i = 1, 2, \ldots, K),$$

where K represents the number of items of the target historical traffic-effecting parameter information, and $d_i$ is a distance between the $i^{th}$ item of target historical traffic-effecting parameter information and the traffic-effecting parameter information.

To achieve the above object, an embodiment of the present application further discloses a speed prediction apparatus. The apparatus includes:

a first obtaining module configured to obtain traffic-effecting parameter information for a first road segment in a current time period, wherein the traffic-effecting parameter information includes at least one of a parameter of the effect of the current weather on the traffic, a parameter of the effect of an attribute of the current date on the traffic and a parameter of the effect of a special event on the traffic;

a first determining module configured to determine a similarity between the traffic-effecting parameter information and historical traffic-effecting parameter information of the first road segment stored in a historical traffic database, and a second determining module configured to determine target historical traffic-effecting parameter information according to the similarity determined by the first determining module;

a first predicting module configured to predict a first speed of a vehicle on the first road segment in a next time period, according to a speed of a vehicle in a next time period of a time period corresponding to the target historical traffic-effecting parameter information, stored in the historical traffic database.

Optionally, the apparatus may further include:

an identifying module configured to identify at least one second road segment with a distance to the first road segment less than a second preset threshold;

a second obtaining module configured to obtain a second speed of a vehicle on each second road segment in the current time period; and a second predicting module is configured to predict a third speed of the vehicle on the first road segment in the next time period, according to the first speed and the second speed.

Optionally, the apparatus may further include:

a third determining module configured to predict a congestion level for the vehicle on the first road segment in the next time period, according to the predicted speed of the vehicle on the first road segment in the next time period, and a preset correspondence between each speed and a congestion level.

Optionally, the second obtaining module may include:

an obtaining submodule configured to obtain a distance between a first base station and a second base station located in the second road segment, a first instant that a mobile device on a vehicle passes by the first base station in the current time period and a second instant that the mobile device on the vehicle passes by the second base station;

a calculating submodule configured to calculate a speed of the mobile device on the vehicle between the first base station and the second base station according to the distance, first instant and second instant obtained by the obtaining submodule; determine an average value of speeds of mobile devices on a plurality of vehicles between the first base station and the second base station as the second speed of the vehicle on the second road segment in the current time period.

Optionally, the first determining module may include:

a first determining submodule configured to determine a target time period corresponding to the current time period in the historical traffic database; and a second determining submodule configured to determine a similarity between the traffic-effecting parameter information and historical traffic-effecting parameter information of the first road segment in the target time period stored in the historical traffic database.

Optionally, in the case that the traffic-effecting parameter information includes the parameter of the effect of the current weather on the traffic, the parameter of the effect of an attribute of the current date on the traffic and the parameter of the effect of a special event on the traffic, the first determining module is specifically configured to:

obtain the similarity between the traffic-effecting parameter information and the historical traffic-effecting parameter information of the first road segment stored in the historical traffic database according to the following formula:

$$sim(Q, Q_h) = \frac{WW_h + HH_h + EE_h}{\sqrt{W^2 + H^2 + E^2} * \sqrt{W_h^2 + H_h^2 + E_h^2}}$$

where W, H and E respectively represent the parameter of the effect of the current weather on the traffic, the parameter of the effect of an attribute of the current date on the traffic and the parameter of the effect of a special event on the traffic included in the traffic-effecting parameter information, and $W_h$, $H_h$ and $E_h$ respectively represent parameter of the effect of a historical weather on the traffic, a parameter of the effect of an attribute of a historical date on the traffic and a parameter of the effect of a special event on the traffic included in the historical traffic-effecting parameter information.

Optionally, the second determining module may be specifically configured to:

determine historical traffic-effecting parameter information most similar to the traffic-effecting parameter information as the target historical traffic-effecting parameter information.

Optionally, the second determining module may be specifically configured to:

determine at least two items of historical traffic-effecting parameter information, having a similarity to the traffic-effecting parameter information greater than a first preset threshold, as the target historical traffic-effecting parameter information.

Optionally, the first predicting module may include:

a third determining submodule configured to determine a weight for each item of target historical traffic-effecting parameter information, according to a distance between the traffic-effecting parameter information and the target historical traffic-effecting parameter information; and a predicting submodule configured to predict the first speed of the vehicle on the first road segment in the next time period, according to the weight for each item of target historical traffic-effecting parameter information and the speed of the vehicle in the next time period of a time period corresponding to each item of target historical traffic-effecting parameter information, stored in the historical traffic database.

Optionally, the third determining submodule may be specifically configured to:

determine the weight for each item of target historical traffic-effecting parameter information through the following formula:

$$\beta_i = \frac{d_i^{-1}}{\sum_{i=1}^{K} d_i^{-1}}, (i = 1, 2, \ldots, K),$$

where K represent the number of items of the target historical traffic-effecting parameter information, and $d_i$ is a distance between the $i^{th}$ item of target historical traffic-effecting parameter information and the traffic-effecting parameter information.

To achieve the above object, an embodiment of the present application further discloses an electronic device. The electronic device includes: a housing, a processor, a memory, a circuit board and a power supply circuit. The circuit board is placed in a space surrounded by the housing, and the processor and memory are disposed on the circuit board. The power supply circuit is configured to supply power for circuits and components of the electronic device; the memory is configured to store executable program codes; and the processor is configured to execute a program corresponding to the executable program codes by reading the executable program codes stored in the memory, to perform the speed prediction method.

To achieve the above object, an embodiment of the present application further discloses an executable program code that, when being executed, implements the speed prediction method.

To achieve the above object, an embodiment of the present application further discloses a storage medium for storing an executable program code that, when being executed, implements the speed prediction method.

As can be seen from the above technical solutions, the traffic-effecting parameter information of a first road segment in a current time period is obtained, wherein the traffic-effecting parameter information includes at least one of a parameter of the effect of the current weather on the traffic, a parameter of the effect of an attribute of the current date on the traffic and a parameter of the effect of a special event on the traffic. A similarity between the traffic-effecting parameter information and historical traffic-effecting parameter information of the first road segment stored in a historical traffic database, and determine target historical traffic-effecting parameter information is determined according to the determined similarity. A first speed of a vehicle on the first road segment in a next time period is predicted, according to a speed of a vehicle in a next time period of a time period corresponding to the target historical traffic-effecting parameter information stored in the historical traffic database.

As can be seen from the above, embodiments of the present application are applied to determine a historical state closest to a state of the first road segment in the current time period according to at least one of the parameter of the effect of the current weather on the traffic, the parameter of the effect of an attribute of the current date on the traffic and the parameter of the effect of a special event on the traffic, and predict the speed of the vehicle on the first road segment in the next time period according to the speed of a vehicle in a next time period in the closest historical state, thereby achieving prediction of the speed of vehicles on the road segment.

BRIEF DESCRIPTION OF THE DRAWINGS

The drawings used in embodiments and the prior art are hereafter introduced briefly to more clearly illustrate technical solutions of the embodiments of the present application and the prior art. Obviously, figures described below are only for some embodiments of the present application. One of ordinary skill in the art may obtain other figures according to these figures without creative efforts.

DETAILED DESCRIPTION

To make objectives, technical solutions and advantages of the present application more apparent, embodiments of the present application are further illustrated in details with reference to the drawings by way of example. Obviously, embodiments described here are only some embodiments of the present application, not all embodiments. All other embodiments obtained by those having ordinary skill in the art based on the embodiments herein, without making any inventive efforts, fall within the extent of protection of the present application.

To solve the problems existing in the prior art, embodiments of the present application provide a speed prediction method and apparatus, which may be applicable to a computer, a microcontroller, an integrated circuit, or a microprocessor of a hand-held mobile device, which is not limited herein. First, the speed prediction method according to an embodiment of the present application will be described below in detail.

Figure 1:
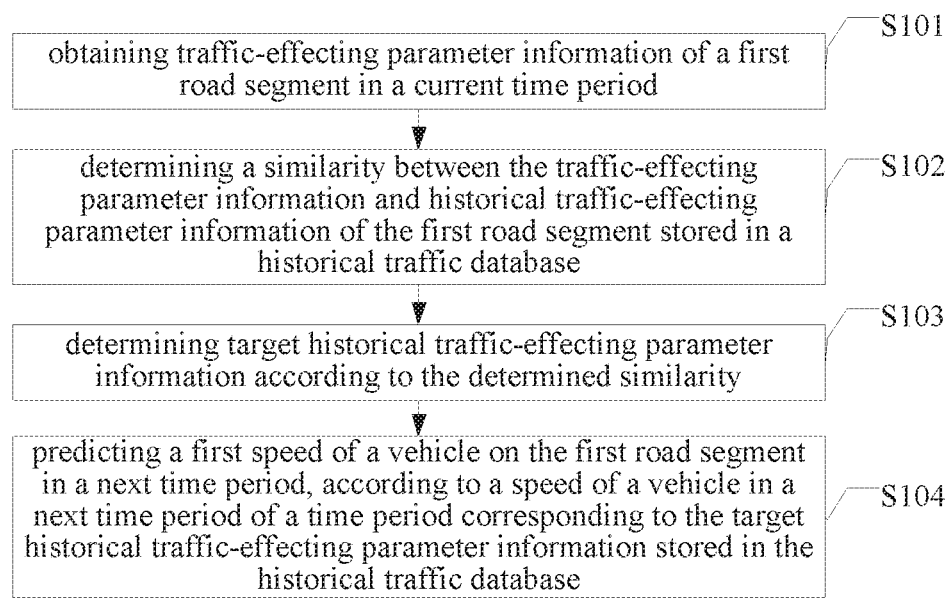
FIG. 1 is a first flow chart of a speed prediction method according to an embodiment of the present application.

FIG. 1 is a first flow chart of a speed prediction method according to an embodiment of the present application. The method includes:

S101: obtaining traffic-effecting parameter information of a first road segment in a current time period. The traffic-effecting parameter information comprises at least one of a parameter of the effect of the current weather on the traffic, a parameter of the effect of an attribute of the current date on the traffic and a parameter of the effect of a special event on the traffic.

S102: determining a similarity between the traffic-effecting parameter information and historical traffic-effecting parameter information of the first road segment stored in a historical traffic database.

Specifically, in the case that the traffic-effecting parameter information includes the parameter of the effect of the current weather on the traffic, the parameter of the effect of an attribute of the current date on the traffic and the parameter of the effect of a special event on the traffic, it is possible to obtain the similarity between the traffic-effecting parameter information and the historical traffic-effecting parameter information of the first road segment stored in the historical traffic database according to the following formula:

$$sim(Q, Q_h) = \frac{WW_h + HH_h + EE_h}{\sqrt{W^2 + H^2 + E^2} * \sqrt{W_h^2 + H_h^2 + E_h^2}}$$

where W, H and E respectively represent the parameter of the effect of the current weather on the traffic, the parameter of the effect of an attribute of the current date on the traffic and the parameter of the effect of a special event on the traffic included in the traffic-effecting parameter information, and $W_h$, $H_h$ and $E_h$ respectively represent a parameter of the effect of a historical weather on the traffic, a parameter of the effect of an attribute of a historical date on the traffic and a parameter of the effect of a special event on the traffic included in the historical traffic-effecting parameter information.

In an implementation of the present application, S102 may include:

determining a target time period corresponding to the current time period in the historical traffic database; and determining a similarity between the traffic-effecting parameter information of the first road segment in the current time period and historical traffic-effecting parameter information of the first road segment in the target time period stored in the historical traffic database.

The target time period is described below. It is assumed that the current instant is 9:15 a.m., and the current time period is 9:00-9:30 a.m. according to the division of time periods. The target time period is then a time period of 9:00-9:30 a.m. in a historical date stored in the historical traffic database.

That is to say, for determining the similarity, only historical traffic-effecting parameter information of the first road segment during 9:00-9:30 a.m. stored in the historical traffic database is selected, but not all historical traffic-effecting parameter information of the first road segment stored in the historical traffic database. The traffic-effecting parameter information at the same time period on different dates, on one hand, is of more instructive significance, and on the other hand, substantially reduces computing workload.

It should be noted that the division of time periods can be implemented according to actual needs, for example a time period may be set to half an hour, or set to one hour, which is not limited herein.

S103: determining target historical traffic-effecting parameter information according to the determined similarity.

The target historical traffic-effecting parameter information may be determined in the following manners, but not limited thereto.

The target historical traffic-effecting parameter information is determined as historical traffic-effecting parameter information that is most similar to the traffic-effecting parameter information.

This manner of determining the target historical traffic-effecting parameter information is to select a historical state most similar to a state of the first road segment in the current time period, and use the most similar historical state to perform speed prediction. The prediction result is more accurate.

Alternatively, the target historical traffic-effecting parameter information is determined as at least two items of historical traffic-effecting parameter information of which has a similarity with the traffic-effecting parameter information greater than a first preset threshold.

Alternatively, similarities between respective historical traffic-effecting parameter information and the traffic-effecting parameter information are sorted in a descending order, and at least the top two items of historical traffic-effecting parameter information are selected as the target historical traffic-effecting parameter information.

The vehicle speed are predicted with at least two items of target historical traffic-effecting parameter information are determined, avoiding occasionality existing during the determination of the similar historical state, and improving accuracy of the prediction.

S104: predicting a first speed of a vehicle on the first road segment in a next time period, according to a speed of a vehicle in a next time period of a time period corresponding to the target historical traffic-effecting parameter information stored in the historical traffic database.

In the case that at least two items of target historical traffic-effecting parameter information are determined, S104 may include: determining a weight for each item of target historical traffic-effecting parameter information, according to a distance between the traffic-effecting parameter information and the target historical traffic-effecting parameter information; and determining the first speed of the vehicle on the first road segment in the next time period, according to the weight for each item of target historical traffic-effecting parameter information and the speed of the vehicle in the next time period of a time period corresponding to each item of target historical traffic-effecting parameter information, stored in the historical traffic database.

In an implementation of the present application, the weight for each item of target historical traffic-effecting parameter information is determined through the following $$\beta_i = \frac{d_i^{-1}}{\sum_{i=1}^{K} d_i^{-1}}, (i = 1, 2, \ldots, K),$$

where K represents the number of items of the target historical traffic-effecting parameter information, and $d_i$ is a distance between the $i^{th}$ item of target historical traffic-effecting parameter information and the traffic-effecting parameter information.

For example, the k-Nearest Neighbor algorithm (KNN algorithm) may be used to perform sample training. K items of the target historical traffic-effecting parameter information which has a higher similarity to the traffic-effecting parameter information in the current time period are determined according to the similarities. The distance $d_i$ between the traffic-effecting parameter information in the current time period and the target historical traffic-effecting parameter information. The weight $\beta_i$ for each item of target historical traffic-effecting parameter information is then determined.

In an embodiment illustrated in the present application, it is assumed that the traffic-effecting parameter information includes the parameter of the effect of the current weather on the traffic, the parameter of the effect of an attribute of a current date on the traffic and the parameter of the effect of a special event on the traffic.

In an implementation of the present application, The influences exerted by a weather factor, a festival and holiday factor and a special event factor on the traffic may be quantized into grade values, that is, the parameter of the effect of the current weather on the traffic, the parameter of the effect of an attribute of the current date on the traffic and the parameter of the effect of a special event on the traffic described above may be grade values. For example, the parameter W about the current weather on the traffic may be defined as follows:

$$W = \begin{cases} 0.1, & \text{no alert} \\ 0.3, & \text{blue alert} \\ 0.5, & \text{yellow aleart} \\ 0.7, & \text{orange alert} \\ 0.9, & \text{red alert} \end{cases}$$

The parameter H of the effect of an attribute of a current date on the traffic may be defied as: when the attribute of the current date is a non-holiday day, H=0.1; when the attribute of the current date is Saturday or Sunday, H=0.3; when the attribute of the current date is a certain day in a three-day holiday, H=0.5; when the attribute of the current date is a certain day in the National Day break, H=0.7; and when the attribute of the current date is a certain day in the Spring Festival holiday, H=0.9.

The parameter E of the effect of a special event on the traffic may be defined as: when a special event such as road repair, traffic accident or important sport event occurs, E=0.1; when no special event occurs, E=0.

It is assumed that the current instant is 9:15 a.m., and the current time period is 9:00-9:30 a.m. according to the division of time periods. The traffic-effecting parameter information of the first road segment (road segment A) in the current time period (9:00-9:30 am) is obtained as: W=0.5, H=0.3, and E=0.1.

It is possible to calculate similarities between the above traffic-effecting parameter information and all historical traffic-effecting parameter information of the road segment A stored in the historical traffic database, or the historical traffic-effecting parameter information of the road segment A in 9:00-9:30 a.m. stored in the historical traffic database may be selected to calculate the similarities between the traffic-effecting parameter information and the selected historical traffic-effecting parameter information.

In the present embodiment, it is possible to first select the historical traffic-effecting parameter information of the road segment A in 9:00-9:30 a.m. stored in the historical traffic database. The similarities between the traffic-effecting parameter information and the selected historical traffic-effecting parameter information are calculated.

The similarity between the traffic-effecting parameter information and the historical traffic-effecting parameter information of the road segment A in 9:00-9:30 am stored in the historical traffic database may be determined according to the following formula:

$$sim(Q, Q_h) = \frac{WW_h + HH_h + EE_h}{\sqrt{W^2 + H^2 + E^2} * \sqrt{W_h^2 + H_h^2 + E_h^2}}.$$

For example, the historical traffic-effecting parameter information of the road segment A in 9:00-9:30 a.m. stored in the historical traffic database is as shown in Table 1. For brevity purpose, Table 1 illustrates only partial content of "the historical traffic-effecting parameter information of the road segment A in the time period 9:00-9:30 a.m.", which does not represent all content stored in the historical traffic database.

TABLE 1

| Serial No. | $W_h$ | $H_h$ | $E_h$ |
|---|---|---|---|
| 1 | 0.1 | 0.9 | 0.1 |
| 2 | 0.9 | 0.1 | 0 |
| 3 | 0.3 | 0.3 | 0.1 |

It is possible to obtain the following according to $$sim(Q, Q_h) = \frac{WW_h + HH_h + EE_h}{\sqrt{W^2 + H^2 + E^2} * \sqrt{W_h^2 + H_h^2 + E_h^2}};$$

the similarity between the historical traffic-effecting parameter information and the obtained traffic-effecting parameter information =

$$\frac{0.5*0.1+0.3*0.9+0.1*0.1}{\sqrt{0.5^2+0.3^2+0.1^2} * \sqrt{0.1^2+0.9^2+0.1^2}} = 0.61;$$

the similarity between the #2 historical traffic-effecting parameter information and the obtained traffic-effecting parameter information =

$$\frac{0.5*0.9+0.3*0.1+0.1*0}{\sqrt{0.5^2+0.3^2+0.1^2} * \sqrt{0.9^2+0.1^2+0}} = 0.90; \text{ and}$$

the similarity between the #3 historical traffic-effecting parameter information and the obtained traffic-effecting parameter information =

$$\frac{0.5*0.3+0.3*0.3+0.1*0.1}{\sqrt{0.5^2+0.3^2+0.1^2} * \sqrt{0.3^2+0.3^2+0.1^2}} = 0.96.$$

The historical traffic-effecting parameter information which has the highest similarity to the traffic-effecting parameter information may be determined as the target historical traffic-effecting parameter information, namely, the #3 historical traffic-effecting parameter information is determined as the target historical traffic-effecting parameter information.

At least two items of the historical traffic-effecting parameter information having a similarity to the traffic-effecting parameter information greater than a first preset threshold may also be determined as the target historical traffic-effecting parameter information. Assuming that the first preset threshold is 0.8, the historical traffic-effecting parameter information whose similarity to the obtained traffic-effecting parameter information is greater than 0.8, namely, the #2 and #3 historical traffic-effecting parameter information is determined as the target historical traffic-effecting parameter information.

The historical traffic-effecting parameter information, time periods and vehicle speeds are correspondingly stored in the historical traffic database. Assuming partial content of "the historical traffic-effecting parameter information, time periods and vehicle speeds" stored in the historical traffic database is as shown in Table 2. For brevity purpose, Table 2 illustrates only partial content of "the historical traffic-effecting parameter information, time periods and vehicle speeds", which does not represent all content stored in the historical traffic database.

TABLE 2

| Serial No. | Historical traffic-effecting parameter information | Time periods | Vehicle speeds |
|---|---|---|---|
| 1 | $W_h$: 0.1; $H_h$: 0.9; $E_h$: 0.1 | 9:00-9:30 a.m. | 100 km/h |
|   |   | 9:30-10:00 a.m. | 120 km/h |
| 2 | $W_h$: 0.9; $H_h$: 0.1; $E_h$: 0 | 9:00-9:30 a.m. | 60 km/h |
|   |   | 9:30-10:00 a.m. | 40 km/h |

TABLE 2-continued

| Serial No. | Historical traffic-effecting parameter information | Time periods | Vehicle speeds |
|---|---|---|---|
| 3 | $W_h$: 0.3; $H_h$: 03; $E_h$: 0.1 | 9:00-9:30 a.m. | 70 km/h |
|   |   | 9:30-10:00 a.m. | 60 km/h |

It is assumed that the #2 and #3 historical traffic-effecting parameter information is determined as the target historical traffic-effecting parameter information.

It is possible to determine the distance $d_i$ between each target historical traffic-effecting parameter information and the obtained traffic-effecting parameter information through but not limited to the following calculation manners: Euclidean distance, Manhattan distance, Mahalanobis distance and Hamming distance.

The Manhattan distance is taken as an example to illustrate how to obtain the distance between the target historical traffic-effecting parameter information and the traffic-effecting parameter information in the current time period:

Assuming the vector for the traffic-effecting parameter information A in the current time period is $(W_{ha}, H_{ha}, E_{ha})$, and the vector for the target historical traffic-effecting parameter information B is $(W_{hb}, H_{hb}, E_{hb})$, the distance $d_{ab}$ between A and B is calculated by the Manhattan distance formula as:

$$d_{ab} = |W_{hb} - W_{ha}| + |H_{hb} - H_{ha}| + |E_{hb} - E_{ha}|$$

It is assumed that the distance $d_i$ between the #2 historical traffic-effecting parameter information and the traffic-effecting parameter information of a road segment A in the time period 9:00-9:30 a.m. is equal to 5, and the distance $d_2$ between the #3 historical traffic-effecting parameter information and the traffic-effecting parameter information of the road segment A in the time period 9:00-9:30 a.m. is equal to 3.

The weight for each target historical traffic-effecting parameter information is determined as $$\beta_i = \frac{d_i^{-1}}{\sum_{i=1}^{K} d_i^{-1}}, (i = 1, 2, \ldots, K),$$

wherein K is the number of the items of target historical traffic-effecting parameter information.

The weight for #2 historical traffic-effecting parameter information is $\beta 1 = 3/8$, and the weight for #3 historical traffic-effecting parameter information is $\beta 2 = 5/8$.

The first speed of the vehicle on the first road segment in the next time period may be predicted according to the weight for each item of target historical traffic-effecting parameter information and the speed of the vehicle in a next time period of a time period corresponding to the target historical traffic-effecting parameter information stored in the historical traffic database, by performing weighted average of the speeds of vehicles in the next time period of the time period corresponding to each item of target historical traffic-effecting parameter information.

For example, the weight for #2 historical traffic-effecting parameter information is 3/8, and the speed of the vehicle in the next time period of the corresponding time period is 40 km/h; the weight for #3 historical traffic-effecting parameter information is 5/8, and the speed of the vehicle in the next time period of the corresponding time period is 60 km/h; it is predicted that the first speed of the vehicle on the first road segment in the next time period will be 40 km/h*⅜+60 km/h*⅝=52.5 km/h.

In another embodiment of the present application, the target historical traffic-effecting parameter information may be determined as the #3 historical traffic-effecting parameter information. The speed of the vehicle in the next time period of the time period corresponding to the #3 historical traffic-effecting parameter information is 60 km/h, and the first speed of the vehicle on the first road segment in the next time period is predicted to be 60 km/h.

The first speed may reflect an average vehicle speed on the first road segment in the next time period, and the prediction of the speed of vehicles on the road segment is achieved.

The embodiment shown in FIG. 1 of the present application may be applied to determine a historical state closest to a state of the first road segment in the current time period according to at least one of the parameter of the effect of the current weather on the traffic, the parameter of the effect of an attribute of the current date on the traffic and the parameter of the effect of a special event on the traffic, and predict the speed of the vehicle on the first road segment in the next time period according to the speed of a vehicle in a next time period in the closest historical state, thereby achieving prediction of the speed of vehicles on the road segment.

Figure 2:
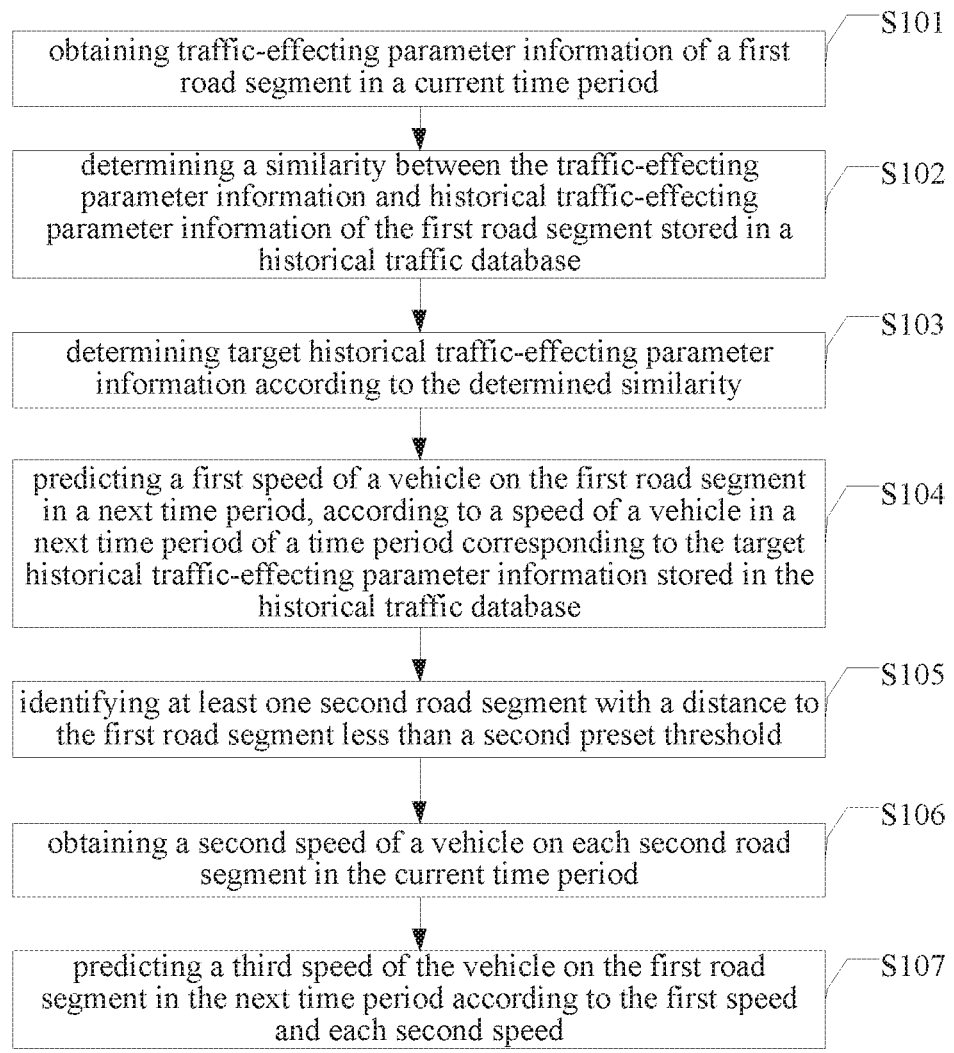
FIG. 2 is a second flow chart of a speed prediction method according to an embodiment of the present application.

FIG. 2 is a second flow chart of a speed prediction method according to an embodiment of the present application. On the basis of the embodiment shown in FIG. 1 of the present application, the embodiment shown in FIG. 2 further includes the following operations:

S105: identifying at least one second road segment with a distance to the first road segment less than a second preset threshold.

The second road segment may be, for example, a road segment before or after the first road segment, or a road segment connected with the first road segment at a crossing.

S106: obtaining a second speed of a vehicle on each second road segment in the current time period.

In an implementation of the present application, obtaining a corresponding second speed of a vehicle on each second road segment in the current time period may include: obtaining a distance between a first base station and a second base station located in the second road segment, a first instant that a mobile device on the vehicle passes by the first base station in the current time period and a second instant that the mobile device on the vehicle passes by the second base station; calculating a speed of the mobile device on the vehicle between the first base station and the second base station according to the obtained distance, the first instant and the second instant; and determining an average value of speeds of mobile devices on a plurality of vehicles between the first base station and the second base station as the second speed of the vehicle on the second road segment in the current time period.

Alternatively, the corresponding second speed of the vehicle on each second road segment in the current time period may be obtained in other ways. For example, the current speed of the vehicle on the second road segment may be measured using a camera installed on the second road segment, using satellite cloud images, or using a GPS on the vehicle, and the like.

S107: predicting a third speed of the vehicle on the first road segment in the next time period according to the first speed and each second speed.

In an embodiment of the present application, assuming that the second preset threshold is 1 km, and the second road segment with a distance from the first road segment less than the second preset threshold is to be identified. The above example is still taken for illustration. It is assumed that the identified second road segments whose distance from the first road segment (road segment A) is less than 1 km include road segment B and road segment C.

Specifically, the corresponding second speed of vehicles on the road segment B and on the road segment C in the current time period may be obtained through the following process.

It is assumed that the distance between the base station X and the base station Y in the road segment B is 600 m, the instant when the mobile device on the vehicle passes by the base station X in the current time period (9:00-9:30 a.m.) is 9:16 a.m., and the instant when the mobile device on the vehicle passes by the base station Y is 9:18 a.m.

It should be noted that the mobile device on the vehicle may be a mobile device used by a user travelling by the vehicle. In this case, a device employing the speed prediction method in the embodiment of the present application may predict a calculation path based on the vehicle speed, predict time when reaching the destination, and thereby optimize the navigation path.

Based on the obtained distance 600 m, first instant 9:16 a.m. and second instant 9:18 a.m., the speed of the mobile device on the vehicle between the first base station and second base station may be calculated as 600 m/2 m=18 km/h.

The above method is used to obtain speeds of mobile devices on a plurality of vehicles between the base station X and base station Y. It is assumed that speeds of mobile devices on 6 vehicles between the base station X and base station Y are 18 km/h, 40 km/h, 30 km/h, 20 km/h, 26 km/h and 28 km/h. An average value of the above six values, namely, 27 km/h is determined as the corresponding second speed of the vehicle on the road segment B in the current time period (9:00-9:30 a.m.).

The same method is employed to obtain the corresponding second speed of the vehicle on the road segment C in the current time period (9:00-9:30 a.m.), which is, for example, 45 km/h.

In practical application, a correlation coefficient for each second road segment with respect to the first road segment may be set in advance according to the influence exerted by the second road segment on the first road segment. The greater the influence is, the larger the correlation coefficient is.

It is assumed that the correlation coefficient for the road segment B with respect to the first road segment A is 20%, and the correlation coefficient for the road segment C with respect to the first road segment A is 30%. In practical application, the sum of the correlation coefficient for the second road segment with respect to the first road segment and the weight for the predicted first speed is a fixed value, for example 1. Hence, the weight for the first step is 50%.

It may be predicted from this that the third speed of the vehicle on the first road segment in the next time period=52.5 km/h*50%+27 km/h*20%+45 km/h*30%=45.15 km/h.

The third speed may reflect an average vehicle speed on the first road segment in the next time period, and the prediction of the speed of vehicles on the road segment is achieved.

The embodiment shown in FIG. 2 of the present application may be applied to determine a historical state closest to a state of the first road segment in the current time period according to at least one of the parameter of the effect of the current weather on the traffic, the parameter of the effect of an attribute of the current date on the traffic and the parameter of the effect of a special event on the traffic, and predict the first speed of the vehicle on the first road segment in the next time period according to the speed of a vehicle in a next time period in the closest historical state; and predict the third speed of the vehicle on the first road segment in the next time period, based on the second speed of the vehicle on each second segment with a distance to the first road segment less than the second preset threshold in the current time period, thereby achieving precise prediction of the speed of vehicles on the road segment.

Figure 3:
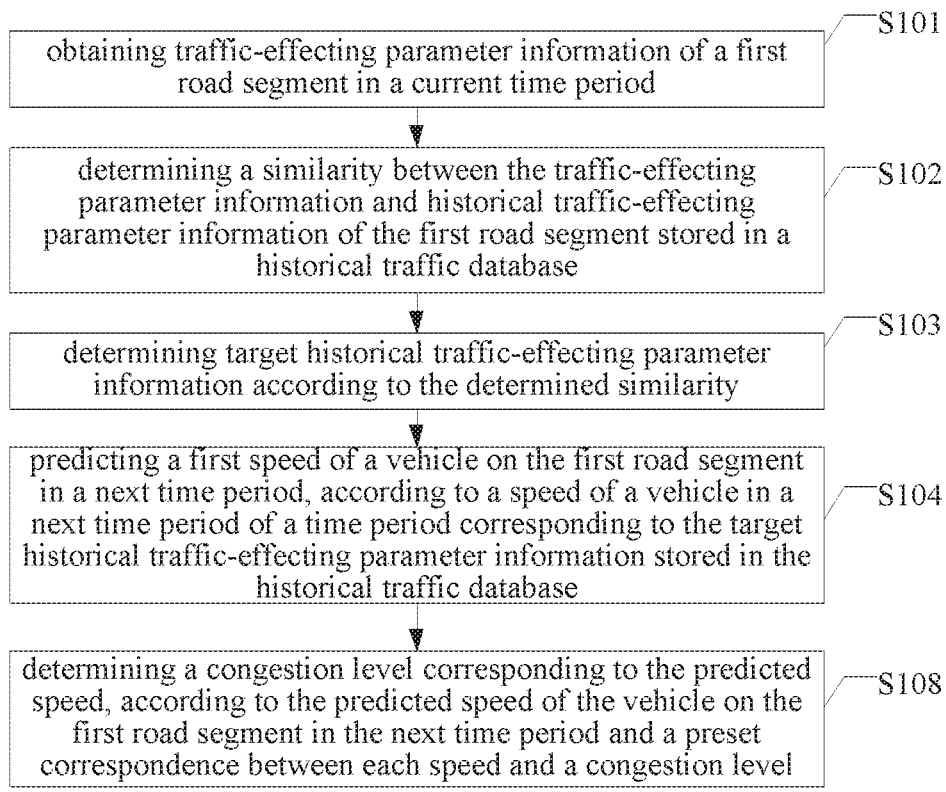
FIG. 3 is a third flow chart of a speed prediction method according to an embodiment of the present application.

FIG. 3 is a third flow chart of a speed prediction method according to an embodiment of the present application. On the basis of the embodiment shown in FIG. 1 of the present application, the embodiment shown in FIG. 3 further includes the operation S108: determining a congestion level corresponding to the predicted speed, according to the predicted speed of the vehicle on the first road segment in the next time period and a preset correspondence between each speed and a congestion level.

In practical application, it is assumed that the preset correspondence between speeds and congestion levels includes: when the speed ≥50 km/h, the corresponding congestion level is smooth; when 30 km/h<the speed <50 km/h, the corresponding congestion level is crowded; when 10 km/h≤the speed ≤30 km/h, the corresponding congestion level is congested; when the speed is <10 km/h, the corresponding congestion level is deadlock.

The example of the embodiment shown in FIG. 1 of the present application is take for illustration purpose. It is predicted that the speed of the vehicle on the first road segment in the next time period is 52.5 km/h, and the congestion level corresponding to 52.5 km/h is smooth. This indicates that the congestion level of the first road segment in the next time period is smooth.

Alternatively, S108 may also be included in the embodiment shown in FIG. 2 of the present application.

The embodiment shown in FIG. 3 of the present application may be applied to further predict the congestion level for the road segment in the next time period, according to the predicted speed of the vehicle on the road segment in the next time period and a preset correspondence between each speed and a congestion level.

Corresponding to the above method embodiment, an embodiment of the present application further provide a speed prediction apparatus.

Figure 4:
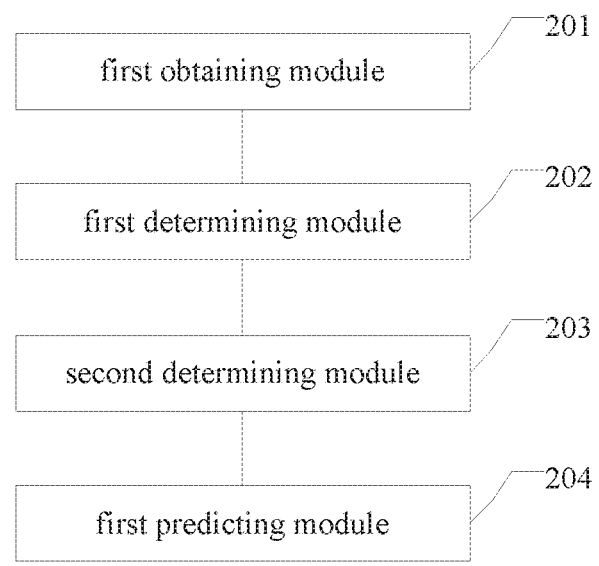
FIG. 4 is a first diagram illustrating the structure of a speed prediction apparatus according to an embodiment of the present application.

FIG. 4 is a diagram illustrating a first structure of a speed prediction apparatus according to an embodiment of the present application. The speed prediction apparatus includes:

a first obtaining module 201 configured to obtain traffic-effecting parameter information of a first road segment in a current time period, wherein the traffic-effecting parameter information includes at least one of a parameter of the effect of the current weather on the traffic, a parameter of the effect of an attribute of the current date on the traffic and a parameter of the effect of a special event on the traffic; a first determining module 202 configured to determine a similarity between the traffic-effecting parameter information and historical traffic-effecting parameter information of the first road segment stored in a historical traffic database;

In an implementation of the present application, the first determining module 202 may include: a first determining submodule and a second determining submodule (not shown).

The first determining submodule is configured to determine a target time period corresponding to the current time period in the historical traffic database.

The second determining submodule is configured to determine a similarity between the traffic-effecting parameter information and historical traffic-effecting parameter information of the first road segment in the target time period stored in the historical traffic database.

In an implementation of the present application, in the case that the traffic-effecting parameter information includes the parameter of the effect of the current weather on the traffic, the parameter of the effect of an attribute of the current date on the traffic and the parameter of the effect of a special event on the traffic, the first determining module 202 is specifically configured to:

obtain the similarity between the traffic-effecting parameter information and the historical traffic-effecting parameter information of the first road segment stored in the historical traffic database according to the following formula:

$$sim(Q, Q_h) = \frac{WW_h + HH_h + EE_h}{\sqrt{W^2 + H^2 + E^2} * \sqrt{W_h^2 + H_h^2 + E_h^2}}$$

where W, H and E respectively represent the parameter of the effect of the current weather on the traffic, the parameter of the effect of an attribute of the current date on the traffic and the parameter of the effect of a special event on the traffic included in the traffic-effecting parameter information, and $W_h$, $H_h$ and $E_h$ respectively represent a parameter of the effect of a historical weather on the traffic, a parameter of the effect of an attribute of a historical date on the traffic and a parameter of the effect of a special event on the traffic included in the historical traffic-effecting parameter information.

A second determining module 203 is configured to determine target historical traffic-effecting parameter information according to the similarity determined by the first determining module.

In an implementation of the present application, the second determining module 203 may be specifically configured to:

determine historical traffic-effecting parameter information most similar to the traffic-effecting parameter information as the target historical traffic-effecting parameter information.

In another implementation of the present application, the second determining module 203 may be specifically configured to:

determine at least two items of historical traffic-effecting parameter information, having a similarity to the traffic-effecting parameter information greater than a first preset threshold, as the target historical traffic-effecting parameter information.

A first predicting module 204 is configured to predict a first speed of a vehicle on the first road segment in a next time period, according to a speed of a vehicle in a next time period of a time period corresponding to the target historical traffic-effecting parameter information stored in the historical traffic database.

In an implementation of the present application, the first predicting module 204 may include: a third determining submodule and a predicting submodule (not shown).

The third determining submodule is configured to determine a weight for each item of target historical traffic-effecting parameter information, according to a distance between the traffic-effecting parameter information and the target historical traffic-effecting parameter information.

The predicting submodule is configured to predict the first speed of the vehicle on the first road segment in the next time period, according to the weight for each item of target historical traffic-effecting parameter information and the speed of the vehicle in the next time period of a time period corresponding to the target historical traffic-effecting parameter information, stored in the historical traffic database.

In an implementation of the present application, the third determining submodule may be specifically configured to:

determine the weight for each item of target historical traffic-effecting parameter information through the following formula:

$$\beta_i = \frac{d_i^{-1}}{\sum_{i=1}^{K} d_i^{-1}}, (i = 1, 2, \ldots, K),$$

where K represents the number of items of the target historical traffic-effecting parameter information, and $d_i$ is a distance between the $i^{th}$ item of target historical traffic-effecting parameter information and the traffic-effecting parameter information.

The embodiment shown in FIG. 1 of the present application may be applied to determine a historical state closest to a state of the first road segment in the current time period according to at least one of the parameter of the effect of the current weather on the traffic, the parameter of the effect of an attribute of the current date on the traffic and the parameter of the effect of a special event on the traffic, and predict the speed of the vehicle on the first road segment in the next time period according to the speed of a vehicle in a next time period in the closest historical state, thereby achieving prediction of the speed of vehicles on the road segment.

Figure 5:
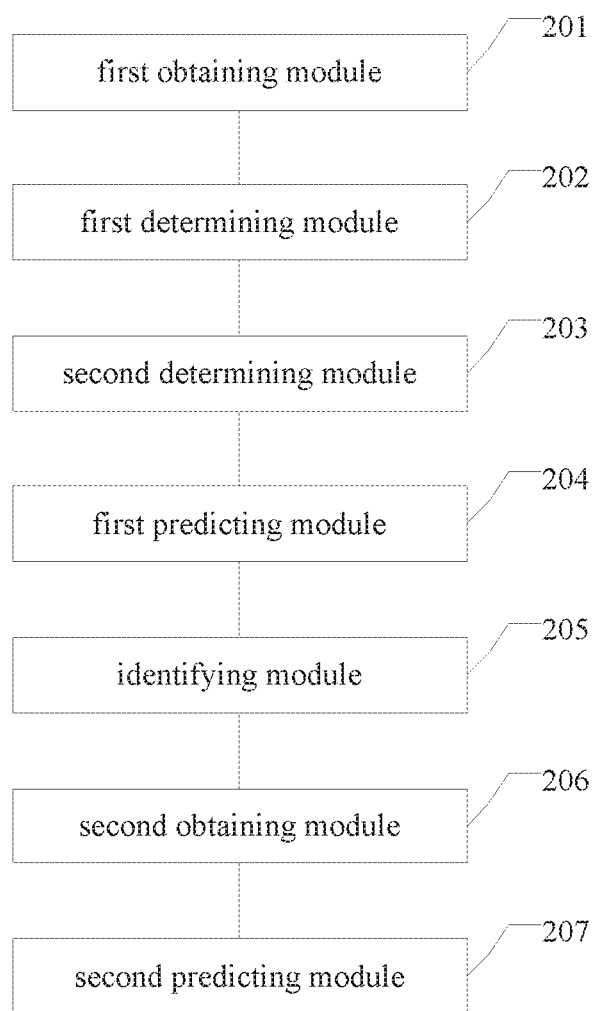
FIG. 5 is a second diagram illustrating the structure of a speed prediction apparatus according to an embodiment of the present application.

FIG. 5 is a diagram illustrating a second structure of a speed prediction apparatus according to an embodiment of the present application. On the basis of the embodiment shown in FIG. 4 of the present application, the embodiment shown in FIG. 5 may further include:

an identifying module 205 configured to identify at least one second road segment with a distance to the first road segment less than a second preset threshold;

a second obtaining module 206 configured to obtain a second speed of a vehicle on each second road segment in the current time period.

In practical application, the second obtaining module 206 may include: an obtaining submodule and a calculating submodule (not shown).

The obtaining submodule is configured to obtain a distance between a first base station and a second base station located in the second road segment, a first instant that a mobile device on a vehicle passes by the first base station in the current time period and a second instant that the mobile device on the vehicle passes by the second base station.

The calculating submodule is configured to calculate a speed of the mobile device on the vehicle between the first base station and the second base station according to the distance, the first instant and the second instant obtained by the obtaining submodule; determine an average value of speeds of mobile devices on a plurality of vehicles between the first base station and the second base station as the second speed of the vehicle on the second road segment in the current time period.

A second predicting module 207 is configured to predict a third speed of the vehicle on the first road segment in the next time period according to the first speed and the second speed.

The embodiment shown in FIG. 5 of the present application may be applied to determine a historical state closest to a state of the first road segment in the current time period according to at least one of the parameter of the effect of the current weather on the traffic, the parameter of the effect of an attribute of the current date on the traffic and the parameter of the effect of a special event on the traffic, and predict the first speed of the vehicle on the first road segment in the next time period according to the speed of a vehicle in a next time period in the closest historical state; and predict the third speed of the vehicle on the first road segment in the next time period, based on the second speed of the vehicle on each second segment with a distance to the first road segment less than the second preset threshold in the current time period, thereby achieving precise prediction of the speed of vehicles on the road segment.

Figure 6:
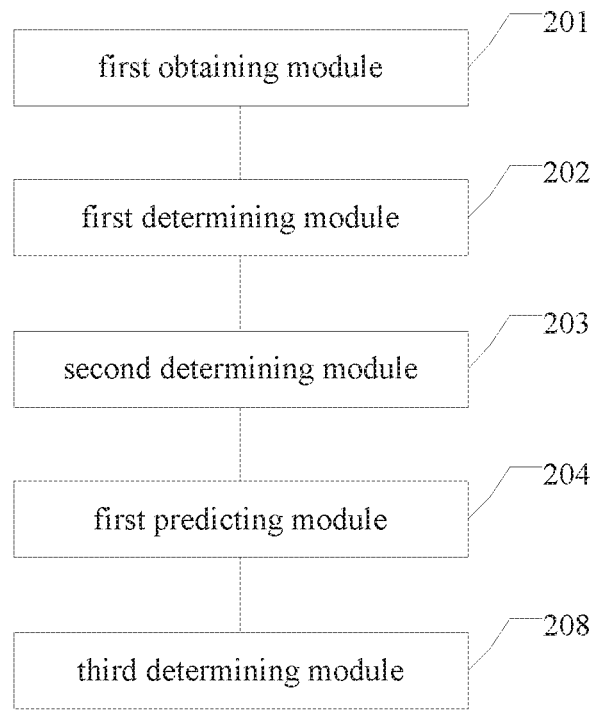
FIG. 6 is a third diagram illustrating the structure of a speed prediction apparatus according to an embodiment of the present application.

FIG. 6 is a diagram illustrating a third structure of a speed prediction apparatus according to an embodiment of the present application. On the basis of the embodiment shown in FIG. 4 of the present application, the embodiment shown in FIG. 6 may further include:

a third determining module 208 configured to predict a congestion level for the vehicle on the first road segment in the next time period, according to the predicted speed of the vehicle on the first road segment in the next time period and a preset correspondence between each speed and a congestion level.

The third determining module 208 may also be included on the basis of the embodiment shown in FIG. 5 of the present application.

The embodiment shown in FIG. 6 of the present application may be applied to further predict the congestion level of the road segment in the next time period, according to the predicted speed of the vehicle on the road segment in the next time period and the preset correspondence between each speed and a congestion level.

Figure 7:
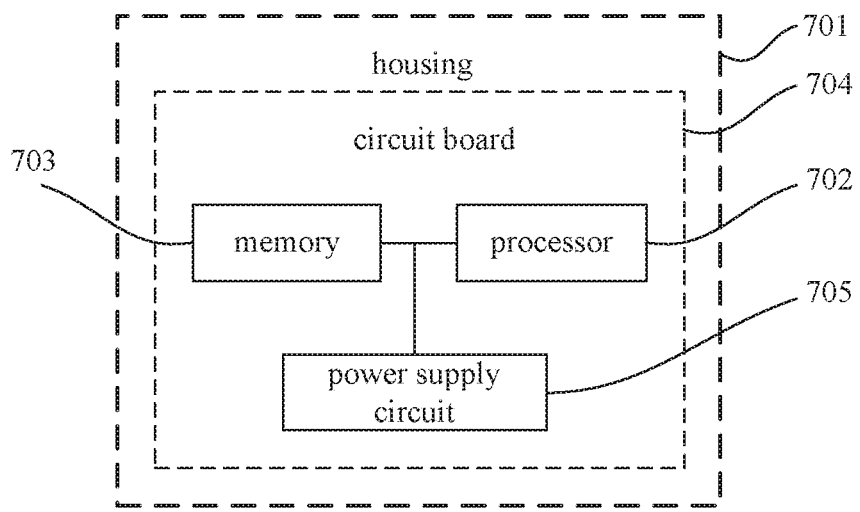
FIG. 7 is a diagram illustrating the structure of an electronic device according to an embodiment of the present application.

An embodiment of the present application further provides an electronic device. As shown in FIG. 7, the electronic device include: a housing 701, a processor 702, a memory 703, a circuit board 704 and a power supply circuit 705. The circuit board 704 is arranged in a space surrounded by the housing 701, and the processor 702 and the memory 703 are disposed on the circuit board 704. The power supply circuit 705 is configured to supply power for circuits and components of the electronic device. The memory 703 is configured to store executable program codes. The processor 702 is configured to execute a program corresponding to the executable program codes by reading the executable program codes stored in the memory 703, to perform the speed prediction method including:

obtaining traffic-effecting parameter information of a first road segment in a current time period, wherein the traffic-effecting parameter information includes at least one of a parameter of the effect of the current weather on the traffic, a parameter of the effect of an attribute of the current date on the traffic and a parameter of the effect of a special event on the traffic.

determining a similarity between the traffic-effecting parameter information and historical traffic-effecting parameter information of the first road segment stored in a historical traffic database, and determining target historical traffic-effecting parameter information according to the determined similarity; and predicting a first speed of a vehicle on the first road segment in a next time period, according to a speed of a vehicle in a next time period of a time period corresponding to the target historical traffic-effecting parameter information stored in the historical traffic database.

The embodiment shown in FIG. 7 of the present application may be applied to determine a historical state closest to a state of the first road segment in the current time period according to at least one of the parameter of the effect of the current weather on the traffic, the parameter of the effect of an attribute of the current date on the traffic and the parameter of the effect of a special event on the traffic, and predict the speed of the vehicle on the first road segment in the next time period according to the speed of the vehicle in a next time period in the closest historical state, thereby achieving prediction of the speed of vehicles on the road segment.

An embodiment of the present application further provides an executable program code that, when being executed, implements the speed prediction method including:

obtaining traffic-effecting parameter information of a first road segment in a current time period, wherein the traffic-effecting parameter information includes at least one of a parameter of the effect of the current weather on the traffic, a parameter of the effect of an attribute of the current date on the traffic and a parameter of the effect of a special event on the traffic.

determining a similarity between the traffic-effecting parameter information and historical traffic-effecting parameter information of the first road segment stored in a historical traffic database, and determining target historical traffic-effecting parameter information according to the determined similarity; and predicting a first speed of a vehicle on the first road segment in a next time period, according to a speed of a vehicle in a next time period of a time period corresponding to the target historical traffic-effecting parameter information stored in the historical traffic database.

The embodiment illustrated of the present application may be applied to determine a historical state closest to a state of the first road segment in the current time period according to at least one of the parameter of the effect of the current weather on the traffic, the parameter of the effect of an attribute of the current date on the traffic and the parameter of the effect of a special event on the traffic, and predict the speed of the vehicle on the first road segment in the next time period according to the speed of the vehicle in a next time period in the closest historical state, thereby achieving prediction of the speed of vehicles on the road segment.

An embodiment of the present application further provides a storage medium for storing an executable program code. The executable program code, when being executed, implements the speed prediction method, including:

obtaining traffic-effecting parameter information of a first road segment in a current time period, wherein the traffic-effecting parameter information includes at least one of a parameter of the effect of the current weather on the traffic, a parameter of the effect of an attribute of the current date on the traffic and a parameter of the effect of a special event on the traffic.

determining a similarity between the traffic-effecting parameter information and historical traffic-effecting parameter information of the first road segment stored in a historical traffic database, and determining target historical traffic-effecting parameter information according to the determined similarity; and predicting a first speed of a vehicle on the first road segment in a next time period, according to a speed of a vehicle in a next time period of a time period corresponding to the target historical traffic-effecting parameter information, stored in the historical traffic database.

The embodiment shown of the present application may be applied to determine a historical state closest to a state of the first road segment in the current time period according to at least one of the parameter of the effect of the current weather on the traffic, the parameter of the effect of an attribute of the current date on the traffic and the parameter of the effect of a special event on the traffic, and predict the speed of the vehicle on the first road segment in the next time period according to the speed of the vehicle in a next time period in the closest historical state, thereby achieving prediction of the speed of vehicles on the road segment.

It should be noted that, terms such as "first", "second" and the like herein are only used to distinguish an entity or operation from another entity or operation, but do not necessarily require or imply that there is any actual relationship or order between these entities or operations. Moreover, the terms "comprise", "include" and any variants thereof are intended to cover a non-exclusive inclusion, such that, a process, method, product or apparatus including a series of elements not only include those elements listed, but also include other elements not explicitly listed, or also include elements which are intrinsic to the process, method, product or apparatus. Without further limitations, an element defined by the wording "comprise(s) a/an . . . " does not exclude additional identical elements in the process, method, product or apparatus including the element.

Embodiments of the present application are all described in a relevant manner. Reference may be made among embodiments for similar portions. Each embodiment focuses on the differences from other embodiments. Particularly, for the apparatus embodiment, it is described in a simply way because it is substantially similar to the method embodiment, reference may be made to the method embodiment for the relevant portions.

Those having ordinary skill in the art may understand all or some steps in the above method embodiments may be carried out by instructing relevant hardware through a program. The program may be stored in a computer-readable storage medium. The storage medium may include: a ROM/RAM, a magnetic disk, or an optical disk.

What are stated above are only preferred embodiments of the present application and not intended to limit the present application. Any modifications, equivalent substitutions and improvements made within the spirit and principle of the present application all should be included in the extent of protection of the present application.

What is claimed is:

1. A speed prediction method, comprising:
obtaining traffic-effecting parameter information of a first road segment in a current time period, wherein the traffic-effecting parameter information comprises at least one of a parameter of the effect of the current weather on the traffic, a parameter of the effect of an attribute of the current date on the traffic and a parameter of the effect of a special event on the traffic;
determining a similarity between the traffic-effecting parameter information and historical traffic-effecting parameter information of the first road segment stored in a historical traffic database, and determining target historical traffic-effecting parameter information according to the determined similarity;
predicting a first speed of a vehicle on the first road segment in a next time period, according to a speed of a vehicle in a next time period of a time period corresponding to the target historical traffic-effecting parameter information stored in the historical traffic database;
identifying at least one second road segment with a distance to the first road segment less than a second preset threshold, and obtaining a second speed of a vehicle on each second road segment in the current time period; and
predicting a third speed of the vehicle on the first road segment in the next time period according to the first speed and the second speed.

2. The method of claim 1, further comprising:
predicting a congestion level for the vehicle on the first road segment in the next time period, according to the predicted speed of the vehicle on the first road segment in the next time period and a preset correspondence between each speed and a congestion level.

3. The method claim 1, wherein obtaining a second speed of a vehicle on each second road segment in the current time period comprises:
obtaining a distance between a first base station and a second base station located in the second road segment, a first instant that a mobile device on a vehicle passes by the first base station in the current time period and a second instant that the mobile device on the vehicle passes by the second base station;
calculating a speed of the mobile device on the vehicle between the first base station and the second base station according to the distance, the first instant and the second instant; and
determining an average value of speeds of mobile devices on a plurality of vehicles between the first base station and the second base station as the second speed of the vehicle on the second road segment in the current time period.

4. The method of claim 1, wherein determining a similarity between the traffic-effecting parameter information and historical traffic-effecting parameter information of the first road segment stored in a historical traffic database comprises:
determining a target time period corresponding to the current time period in the historical traffic database; and
determining a similarity between the traffic-effecting parameter information and historical traffic-effecting parameter information of the first road segment in the target time period stored in the historical traffic database.

5. The method of claim 1, wherein in the case that the traffic-effecting parameter information comprises the parameter of the effect of the current weather on the traffic, the parameter of the effect of an attribute of the current date on the traffic and the parameter of the effect of a special event on the traffic, determining a similarity between the traffic-effecting parameter information and historical traffic-effecting parameter information of the first road segment stored in a historical traffic database comprises:

obtaining the similarity between the traffic-effecting parameter information and the historical traffic-effecting parameter information of the first road segment stored in the historical traffic database according to the following formula:

$$sim(Q, Q_h) = \frac{WW_h + HH_h + EE_h}{\sqrt{W^2 + H^2 + E^2} * \sqrt{W_h^2 + H_h^2 + E_h^2}}$$

where W, H and E respectively represent the parameter of the effect of the current weather on the traffic, the parameter of the effect of an attribute of the current date on the traffic and the parameter of the effect of a special event on the traffic included in the traffic-effecting parameter information, and Wh, Hh and Eh respectively represent a parameter of the effect of a historical weather on the traffic, a parameter of the effect of an attribute of a historical date on the traffic and a parameter of the effect of a special event on the traffic included in the historical traffic-effecting parameter information.

6. The method of claim 1, wherein determining target historical traffic-effecting parameter information according to the determined similarity comprises:
determining historical traffic-effecting parameter information most similar to the traffic-effecting parameter information as the target historical traffic-effecting parameter information,
or
wherein determining target historical traffic-effecting parameter information according to the determined similarity comprises:
determining at least two items of historical traffic-effecting parameter information, having a similarity to the traffic-effecting parameter information greater than a first preset threshold, as the target historical traffic-effecting parameter information.

7. The method of claim 6, wherein predicting a first speed of a vehicle on the first road segment in a next time period, according to a speed of a vehicle in a next time period of a time period corresponding to the target historical traffic-effecting parameter information stored in the historical traffic database comprises:
determining a weight for each item of target historical traffic-effecting parameter information, according to a distance between the traffic-effecting parameter information and the target historical traffic-effecting parameter information; and
predicting the first speed of the vehicle on the first road segment in the next time period, according to the weight for each item of target historical traffic-effecting parameter information and the speed of the vehicle in the next time period of a time period corresponding to each item of target historical traffic-effecting parameter information, stored in the historical traffic database.

8. The method of claim 7, wherein determining a weight for each item of target historical traffic-effecting parameter information, according to a distance between the traffic-effecting parameter information and the target historical traffic-effecting parameter information comprises:
determining the weight for each item of target historical traffic-effecting parameter information through the following formula:

$$\beta_i = \frac{d_i^{-1}}{\sum_{i=1}^{K} d_i^{-1}}, (i = 1, 2, \ldots, K),$$

where K represents the number of items of the target historical traffic-effecting parameter information, and di is a distance between the ith item of target historical traffic-effecting parameter information and the traffic-effecting parameter information.

9. A speed prediction apparatus, comprising:
a first obtaining module configured to obtain traffic-effecting parameter information of a first road segment in a current time period, wherein the traffic-effecting parameter information comprises at least one of a parameter of the effect of the current weather on the traffic, a parameter of the effect of an attribute of the current date on the traffic and a parameter of the effect of a special event on the traffic;
a first determining module configured to determine a similarity between the traffic-effecting parameter information and historical traffic-effecting parameter information of the first road segment stored in a historical traffic database;
a second determining module configured to determine target historical traffic-effecting parameter information according to the similarity determined by the first determining module;
a first predicting module configured to predict a first speed of a vehicle on the first road segment in a next time period, according to a speed of a vehicle in a next time period of a time period corresponding to the target historical traffic-effecting parameter information stored in the historical traffic database;
an identifying module configured to identify at least one second road segment with a distance to the first road segment less than a second preset threshold;
a second obtaining module configured to obtain a second speed of a vehicle on each second road segment in the current time period; and
a second predicting module is configured to predict a third speed of the vehicle on the first road segment in the next time period according to the first speed and the second speed.

10. The apparatus of claim 9, further comprising:
a third determining module configured to predict a congestion level for the vehicle on the first road segment in the next time period, according to the predicted speed of the vehicle on the first road segment in the next time period and a preset correspondence between each speed and a congestion level.

11. The apparatus of claim 9, wherein the second obtaining module comprises:
an obtaining submodule configured to obtain a distance between a first base station and a second base station located in the second road segment, a first instant that a mobile device on a vehicle passes by the first base station in the current time period and a second instant that the mobile device on the vehicle passes by the second base station;
a calculating submodule configured to calculate a speed of the mobile device on the vehicle between the first base station and the second base station according to the distance, the first instant and the second instant obtained by the obtaining submodule; determine an average value of speeds of mobile devices on a plurality of vehicles between the first base station and the second base station as the second speed of the vehicle on the second road segment in the current time period.

12. The apparatus of claim 9, wherein the first determining module comprises:
a first determining submodule configured to determine a target time period corresponding to the current time period in the historical traffic database; and
a second determining submodule configured to determine a similarity between the traffic-effecting parameter information and historical traffic-effecting parameter information of the first road segment in the target time period stored in the historical traffic database.

13. The apparatus of claim 9, wherein in the case that the traffic-effecting parameter information comprises the parameter of the effect of the current weather on the traffic, the parameter of the effect of an attribute of the current date on the traffic and the parameter of the effect of a special event on the traffic, the first determining module is specifically configured to:
obtain the similarity between the traffic-effecting parameter information and the historical traffic-effecting parameter information of the first road segment stored in the historical traffic database according to the following formula:

$$sim(Q, Q_h) = \frac{WW_h + HH_h + EE_h}{\sqrt{W^2 + H^2 + E^2} * \sqrt{W_h^2 + H_h^2 + E_h^2}}$$

where W, H and E respectively represent the parameter of the effect of the current weather on the traffic, the parameter of the effect of an attribute of the current date on the traffic and the parameter of the effect of a special event on the traffic included in the traffic-effecting parameter information, and Wh, Hh and Eh respectively represent a parameter of the effect of a historical weather on the traffic, a parameter of the effect of an attribute of a historical date on the traffic and a parameter of the effect of a special event on the traffic included in the historical traffic-effecting parameter information.

14. The apparatus of claim 9, wherein the second determining module is specifically configured to:
determine historical traffic-effecting parameter information most similar to the traffic-effecting parameter information as the target historical traffic-effecting parameter information,
or
wherein the second determining module is specifically configured to:
determine at least two items of historical traffic-effecting parameter information, having a similarity to the traffic-effecting parameter information greater than a first preset threshold, as the target historical traffic-effecting parameter information.

15. The apparatus of claim 14, wherein the first predicting module comprises:
a third determining submodule configured to determine a weight for each item of target historical traffic-effecting parameter information, according to a distance between the traffic-effecting parameter information and the target historical traffic-effecting parameter information; and
a predicting submodule configured to predict the first speed of the vehicle on the first road segment in the next time period, according to the weight for each item of target historical traffic-effecting parameter information and the speed of the vehicle in the next time period of a time period corresponding to each item of target historical traffic-effecting parameter information, stored in the historical traffic database.

16. The apparatus of claim 15, wherein the third determining submodule is specifically configured to:

determine the weight for each item of target historical traffic-effecting parameter information through the following formula:

$$\beta_i = \frac{d_i^{-1}}{\sum_{i=1}^{K} d_i^{-1}}, (i = 1, 2, \ldots, K),$$

where K represents the number of items of the target historical traffic-effecting parameter information, and di is a distance between the ith item of target historical traffic-effecting parameter information and the traffic-effecting parameter information.

17. An electronic device, comprising: a housing, a processor, a memory, a circuit board and a power supply circuit, wherein the circuit board is arranged in a space surrounded by the housing, and the processor and memory are disposed on the circuit board; the power supply circuit is configured to supply power for circuits and components of the electronic device; the memory is configured to store executable program codes; and the processor is configured to execute a program corresponding to the executable program codes by reading the executable program codes stored in the memory to perform the speed prediction method of claim 1.

18. A non-transitory storage medium for storing an executable program code that, when being executed, implements the speed prediction method of claim 1.

* * * * *